United States Patent [19]

Carson

[11] Patent Number: 4,493,286
[45] Date of Patent: Jan. 15, 1985

[54] METHOD AND APPARATUS FOR APPLYING A MULTI-COMPONENT ADHESIVE

[75] Inventor: William J. Carson, Sewickley, Pa.

[73] Assignee: Koppers Company, Inc., Pittsburgh, Pa.

[21] Appl. No.: 516,679

[22] Filed: Jul. 25, 1983

[51] Int. Cl.³ .......................... B05D 1/02; B05B 7/12; B05B 7/26

[52] U.S. Cl. .................................. 118/677; 222/135; 427/426; 118/679; 118/683; 118/688; 118/676

[58] Field of Search ................ 222/135; 118/676, 677, 118/683, 688, 679; 427/426

[56] References Cited

U.S. PATENT DOCUMENTS

| | | | |
|---|---|---|---|
| 2,246,502 | 6/1941 | Bramsen et al. | 118/679 |
| 3,236,416 | 2/1966 | Schnell et al. | 222/135 X |
| 3,374,987 | 3/1968 | Joyce et al. | 259/7 |
| 3,595,203 | 7/1971 | Fabulich | 118/683 |
| 3,634,276 | 1/1972 | Kreibich et al. | 252/182 |
| 4,083,473 | 4/1978 | Goodwin et al. | 222/144.5 |
| 4,083,474 | 4/1978 | Walter et al. | 222/145 |
| 4,299,186 | 11/1981 | Pipkin | 118/407 |
| 4,330,354 | 5/1982 | Deubner | 156/352 |
| 4,332,212 | 6/1982 | Jesme | 118/202 |
| 4,333,420 | 6/1982 | Petri | 118/411 |
| 4,340,011 | 7/1982 | Wahren | 118/410 |
| 4,341,327 | 7/1982 | Zeitz | 222/135 X |
| 4,359,965 | 11/1982 | Bridges, Sr. | 118/711 |
| 4,407,431 | 10/1983 | Hatter | 222/135 |

FOREIGN PATENT DOCUMENTS

617632 4/1961 Canada .................................. 118/683

Primary Examiner—Shrive P. Beck
Attorney, Agent, or Firm—Daniel J. Long; Herbert J. Zeh, Jr.

[57] ABSTRACT

An apparatus and method for applying a multi-component liquid adhesive. A liquid resin reservoir and a liquid hardener reservoir are connected by separate conduit means to resin and hardener mix chamber which is positioned adjacent to a dispenser so that the adhesive can be spread at substantially the same time as it is mixed. Separate resin and hardener pumps are each driven by their own variable output capacity power sources and means are provided for sensing the instantaneous speed of these pumps. These sensors are connected to separate control means for the power sources so that the power output to both of the pumps will be proportional to their respective instantaneous speeds. This apparatus compensates for temperature induced changes in viscosity of the resin or hardener so as to allow mixing proportions to remain constant. Also disclosed is a means for increasing or decreasing the total amount of adhesive produced without having to reset the resin and hardener mix and a means for forcing water or air into the mix chamber in the event of an unanticipated stoppage of the system so as to prevent hardening of the mixture in the mix chamber and dispenser.

19 Claims, 3 Drawing Figures

1

METHOD AND APPARATUS FOR APPLYING A MULTI-COMPONENT ADHESIVE

BACKGROUND OF THE INVENTION

1. Field of the Invention.

The present invention deals with multi-component adhesives and, in particular, with methods and apparatus for applying such adhesives.

2. Description of the Prior Art.

Various chemically reactive adhesives which are characterized by the occurrence of a chemical reaction during the formation of the adhesive bond are known in the art. A number of these chemically reactive adhesives are multi-component systems such as urea-formaldehyde, phenol-formaldehyde, resorcinol-formaldehyde or resorcinol-phenol-formaldehyde systems. In a resorcinol-phenol-formaldehyde system, for example, a viscous solution of a water soluble, fusible phenol-resorcinol-formaldehyde resin is first made. So that such a resin may be stored for an extended period of time without hardening, the amount of formaldehyde in this resin is limited. When, however, it is desired that an adhesive mix be formed from this resin in preparation for its application, a methylene donor, commonly referred to as a hardener, is added to the resin to cure it to a cross-linked insoluable, infusible state. Commonly used hardeners are liquids such as aqueous formaldehyde solutions or solids such as or hexamethylenetretramine. Solid hardeners are sometimes mixed with liquids to form a slurry and, for definitional purposes, the use herein of the term "liquid hardener" will encompass hardeners which are in a slurry as well as those hardeners which are in a solution.

It is often desirable that the resin and hardeners in a multi-component adhesive be mixed together as soon as possible before application so as to avoid the possibility that premature curing might occur. In U.S. Pat. No. 3,374,987 an apparatus is disclosed in which an adhesive applicator contains an integral device for mixing a liquid resin and a liquid hardener so that application and mixing occur substantially simultaneously. Although this applicator would appear to substantially preclude the possibility of premature curing of the adhesive, certain problems relating to the application of multi-component adhesives still remain to be addressed. Specifically, it is known that changes in temperatures may result in changes in the viscosities of a liquid resin or a liquid hardener. In as much as a precise ratio of resin to hardener may be required to achieve certain desired characteristics in curing conditions or in the adhesive bond, it may be necessary for an operator to make numerous adjustments to the rates at which liquid resins and hardeners are introduced into the mixer-applicator so as to ensure that this precise ratio is maintained during conditions of changing temperature. Additionally, it may also be desired to increase the rate of flow of adhesive from the applicator. In order to achieve such an increase in adhesive flow rate with mixer-applicators heretofore known, it has been necessary for an operator to engage in the time consuming procedure of increasing the rate of flow of the resin and then increasing the hardener flow rate to the exact rate which would allow maintenance of the desired resin to hardener ratio. It is, therefore, the object of the present invention to provide a method and apparatus for applying a multi-component adhesive in which the mixing of liquid resins and liquid hardeners occurs substantially simultaneously with the application of the resulting adhesive and in which a precise resin to hardener ratio is maintained regardless of changes in temperature or in volumetric requirements for the adhesive.

SUMMARY OF THE INVENTION

The present invention is an apparatus for mixing a liquid resin with a liquid hardener to form a multi-component adhesive and then immediately applying this adhesive to a surface to be bonded. Liquid resin and hardener reservoirs are provided and these reservoirs are both connected by means of separate conduit means and pumps to a resin and hardener mixing device which is itself connected to an adjacent applicator head so that the adhesive is applied substantially simultaneously with its mixing. The pumps are powered by separate variable output power sources. Means are provided for sensing the instantaneous speeds of the pumps and separate control means then adjust the output of each of the power sources so that their outputs are proportional to the instantaneous speeds of the pumps to which they are connected. The amounts of resin and hardener inputed to the mixing device will be substantially constant regardless of temperature induced changes in viscocities. Preferably, a master control will also be provided so that pump speed can be lowered or increased simultaneously in the same proportions on both pumps. Thus, adjustments in the overall rate of adhesive production may be effected without having to reset the resin to hardener mix each time such adjustments are made.

BRIEF DESCRIPTION OF THE DRAWINGS

The present invention is further described in the accompanying drawings in which.

DETAILED DESCRIPTION

Figure 1:
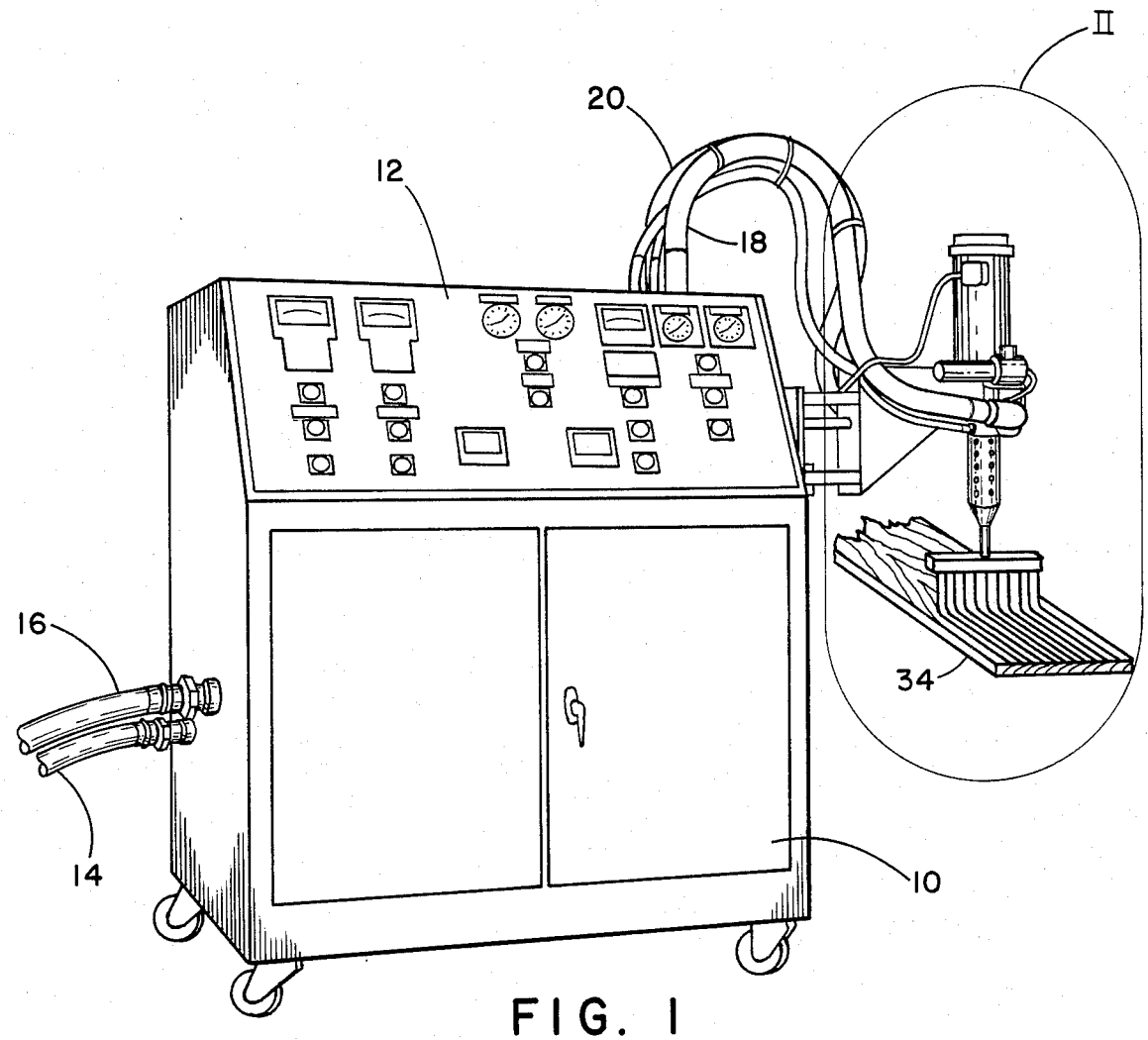
FIG. 1 is a front elevational view of a multi-component adhesive applicator device representing a preferred embodiment of the apparatus of the present invention.

Referring to FIG. 1, it will be seen that the applicator of the present invention includes a casing 10 which houses pumping mechanisms which are described below and on which there is an external operator's control panel 12, the use of which will also be described below. Two conduits 14 and 16 bring resin and hardener respectively from separate external reservoirs (not shown) to the pumping mechanism. Resin and hardener remain separate from each other in the casing 10 and are exited from the casing by means of conduits 18 and 20.

Figure 2:
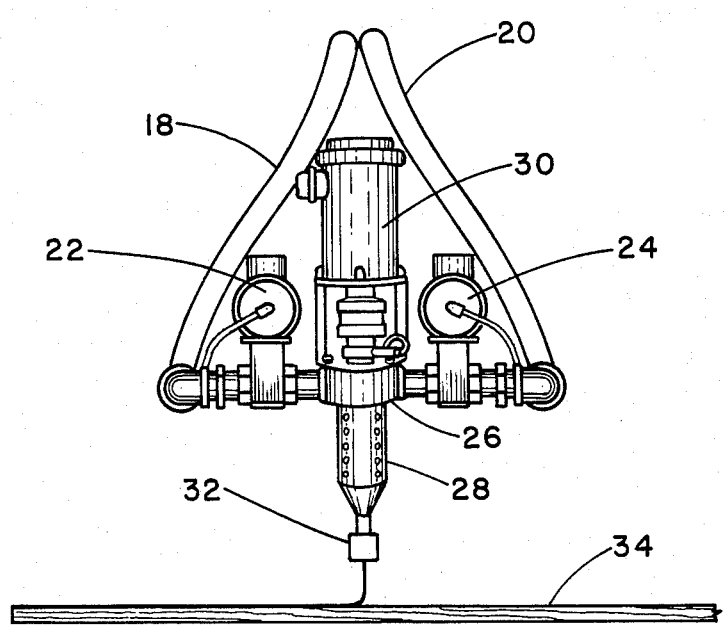
FIG. 2 is an enlarged side elevational view of that part of the apparatus shown in FIG. 1 within Oval II.

Referring particularly to FIG. 2, it will be seen that hoses 18 and 20 are equipped, respectively, with air operated pneumatic valves 22 and 24 and that these hoses both terminate at manifold 26. Positioned below manifold 26, there is a pin mix chamber 28 with a static pin barrel which is driven by electric direct current motor 30. A suitable pin mixer is available from the Martin Sweets Co. located at Louisville, Ky. As is known in the art, the bonding or cure time of the mixed adhesive may be adjusted by making adjustments in the speed of the mixer. After resin and hardener are thoroughly mixed in the desired ratio to form an adhesive, it flows downwardly from the mixer 28 into the disperser 32. This disperser is a tubular structure preferably being outwardly cross sectional square and inwardly cross sectionally circular and being closed at both ends and having a plurality of orifices on its lower side through which the still liquid adhesive flows onto a surface to be bonded such as board 34. This board will be continuously moved beneath the distributor by any suitable conventional drive mechanism.

Figure 3:
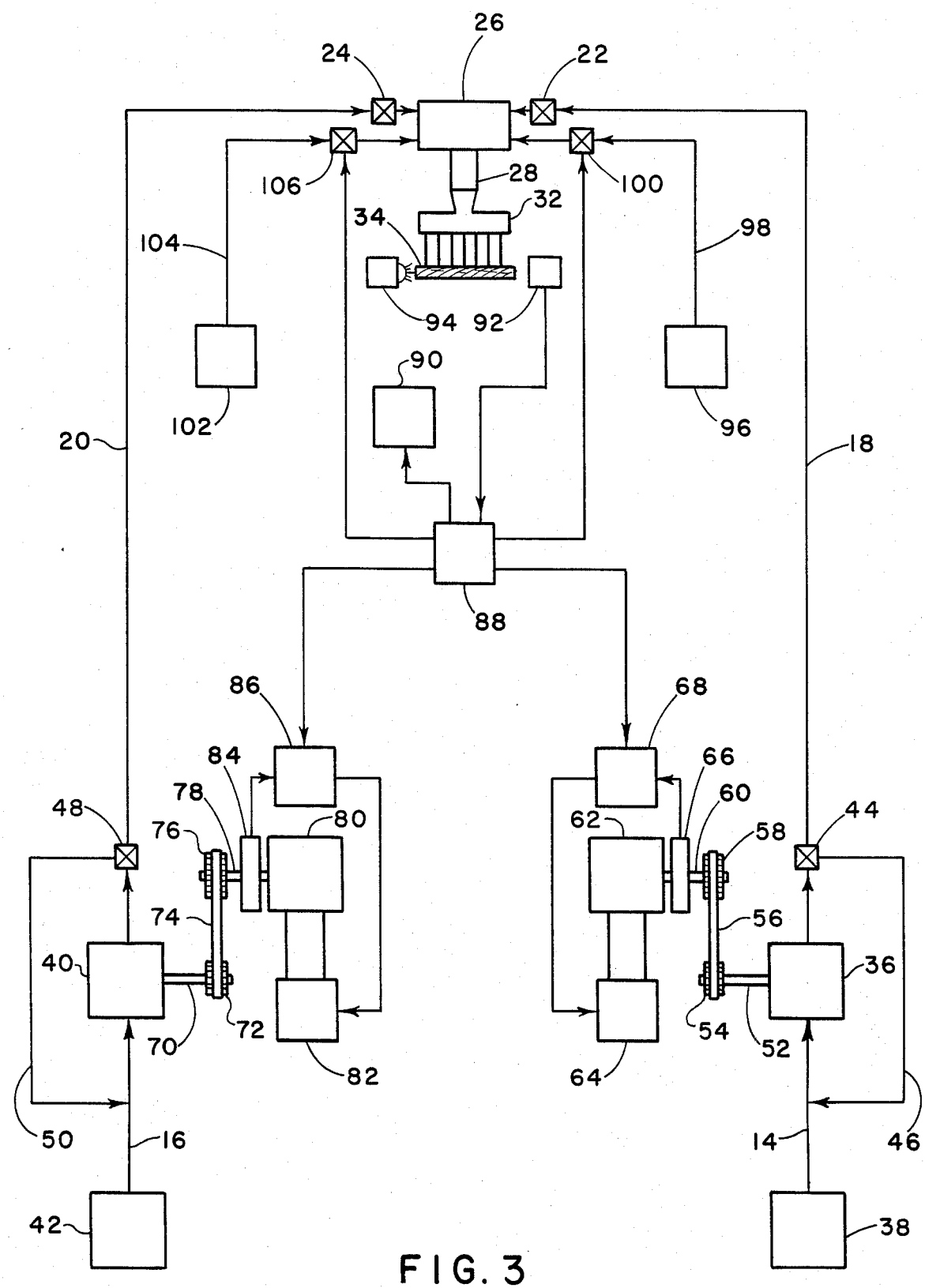
FIG. 3 is a schematic illustration showing the operation of the apparatus shown in FIG. 1.

From FIGS. 1 and 3, it will be seen that a resin pump 36 removes resin from resin reservoir 38 through conduit 14 and then moves resin through conduit 18 and valve 22 to manifold 26. Similarly, a separate hardener pump 40 removes hardener through conduit 16 from hardener resevoir 42 and then moves the hardener through conduit 20 to manifold 26. As was noted above, resin and hardener flow in previously set desired proportions into mix chamber 28 where they are mixed to form an adhesive which is then applied by means of distributor 32.

A pressure relief valve 44 is provided upstream from the resin pump so that in the event there is a blockage in conduit 18 or in the manifold, mixer and distributor combination, resin leaving the resin pump will be returned by way of conduit 46 downstream to conduit 14 so that damage to the system from excessive pressure can be avoided. A similar pressure relief valve 48 is also provided upstream from hardener pump 40 so that hardener can be returned by way of conduit 46 to conduit 16 in the event of a blockage upstream from that valve.

Resin pump 36 has an external rotating shaft 52 on which there is fixed a cogged wheel 54. A cogged belt 56 engages with cogged wheel 54 and also with a second cogged wheel 58. This cogged wheel 58 is at the terminal end of rotating shaft 60 which extends from direct current electric motor 62. This electric motor is powered by a variable capacity direct current power source 64. It will be understood that this motor drives the resin pump by means of the cogged belt 56 which connects the two devices and that the instantaneous speed of the pump will be generally proportional to the rate of output of the direct power source at any particular time.

The shaft 60 passes through rotational velocity sensor 66 which continuously senses the instantaneous velocity of shaft 60 and transmits this data to control device 68. A suitable rotational velocity sensor is available from the Wer Industrial Co. division of Emerson Electric Co., located at Grand Island, New York. It will be understood that the velocity of shaft 60 is approximately proportional to that of the resin pump. The control device 68 is connected to the direct current power source 64 to adjust the rate of output of that power source so that it is always proportional to the speed of the shaft 60 and thus the speed of the resin pump 36. Those skilled in the art will appreciate that it would be possible to use a solid state device for the control device 68 which not only adjusts the power capacity of a power source but also commutates alternating current to the direct current required for electric motor 62. If such a device were used it would be interposed in a circuit between the electric motor 62 and an alternating current power source (not shown) and the direct current power source shown in FIG. 3 could, of course, be eliminated. A suitable solid state device for commutating alternating current and adjusting direct current output to correspond with the speed of shaft 60 is also available from the Wer Industrial Co.

From FIG. 3 it will also be seen that hardener is conveyed to the manifold 26 in substantially the same way as is resin. Externally extending rotating shaft 70 of the hardener pump 40 has a cogged wheel 72 fixed to its terminal end. Cogged belt 74 is peripherally attached to cogged wheel 72 and a second cogged wheel 76 mounted on externally extending rotating shaft 78 of direct current electric motor 80. The electric motor 80 is powered by direct current power source 82, and shaft 78 passes through rotational velocity sensor 84 which is connected to control device 86. As with the controls on the resin side of the apparatus, the electric motor 80 will drive the resin pump and the speed of the rotating shaft 78 will approximately correspond to that of the pump. Thus, when the velocity sensor conveys this shaft speed to the control the output of the power source 82 will be continuously adjusted by the control device 86 so that motor speed and pump speed will remain substantially constant.

The amount of hardener provided to the manifold will therefore remain substantially constant per given unit of time so that the hardener and resin blend will remain substantially uniform regardless of temperature induced changes in viscosity in the resin or the hardener. It will be appreciated, however, that certain liquid hardeners such as formaldehyde solutions do not undergo substantial changes in viscosity with changes in temperatures. Thus, it would, within the scope of the present invention, be possible to eliminate the rotational velocity sensor 84 and the control device 86 on the hardener side of the apparatus so that only the resin side would have controls which would ensure a constant flow rate regardless of viscosity changes in resin viscosity. If the apparatus were to be used solely with a hardener which does not undergo substantial viscosity changes, it might be preferable to use such an embodiment without controls on the hardener side.

The desired ratio of resin to hardener is achieved by initially selecting resin and hardener pump speeds which would result in both the desired relative amounts of resin and hardener being introduced to the manifold and the desired overall amount of adhesive being produced. Those skilled in the art will appreciate that achieving the optimum blend of resin and hardener may, in practice, involve a delicate and time consuming procedure, the frequent repetition of which is desirably avoided.

It will, however, also be appreciated that it may occasionally be necessary to increase or decrease the overall rate of adhesive production without affecting the ratio of resin to hardener in that adhesive. Heretofore, it has been necessary to go through the often laborious procedure of resetting the resin and hardener blend each time that there was a requirement for changing the overall volumetric amount of adhesive produced. In the apparatus of the present invention, on the other hand, there is a master control device 88 which substantially alleviates the above described problems. This master control device is connected to both control device 68 and 86 and allows the speeds of resin pump 36 and hardener pump 40 to be proportionally adjusted so that the overall amount of adhesive produced may be increased or decreased without affecting the resin to hardener blend.

Preferably, the master control device will also be connected to a computer 90 or some other means for counting the total amount of adhesive mixed. The master control device 88 is also preferably connected to a photoelectric cell 92 which is appropriately positioned in combination with light 94 in relation to board 34 so that if there is an interruption in the board a signal will be provided to the master control so that both the resin and the hardener pumps can be stopped thus ceasing further production of mixed adhesive. Preferably, means will also be provided to remove resin and hardener and liquid mixed adhesive from the manifold, mix chamber and disperser in the event of such a shut down. For example, air, water or a combination of air and water can be forced into the manifold to force resin, hardener and mixed adhesive out through the disperser orifices and thereby prevent it from hardening inside the manifold, mix chamber and disperser. In FIG. 3 a compressed air reservoir is shown at number 96. This reservoir is connected by means of line 98 to the manifold 26 and a valve 100 is positioned on this line to ordinarily keep it closed. Similarly, a water reservoir is shown at numeral 102 and is connected to the manifold by means of line 104. Valve 106 is also provided to keep line 104 closed. If, however, a signal is provided from the photoelectric cell 92 to the master control that the motion of board 34 has stopped, the valves 100 and 106 can be opened to allow air and water to be forced into the manifold. Preferably, a timing device will be incorporated into this system so that the valve 100 will be opened to allow air to flow into the manifold several minutes after the stopping of the board and so that valve 106 will not be opened to allow water flow into the manifold until several minutes after air flow has started. Thus, minor problems in the board's motion which can be corrected before hardening begins will not result in the evacuation of resin and hardener and liquid adhesive from the manifold, mix chamber and disperser.

It will thus be appreciated that there has been described a method and apparatus for applying a multi-component adhesive by which precise ratios of resin to hardener may be easily maintained when the resin or hardener undergo substantial changes in viscosity or when the volumetric requirements for adhesive output are substantially modified. Although the invention has been described with a certain degree of particularity, it is to be understood that the present disclosure has been made only as an example and that the scope of the invention is defined by what is hereafter claimed.

What is claimed is:

1. An applicator for a multi-component liquid adhesive consisting of a mixture of a liquid resin and a liquid hardener comprising:
   (a) a liquid resin resevoir;
   (b) a liquid hardener reservoir;
   (c) means for mixing liquid resin and liquid hardener to form a multi-component liquid adhesive;
   (d) an adhesive dispersing means;
   (e) a liquid resin conduit means connecting the liquid resin reservoir to the means for mixing liquid resin and liquid hardener;
   (f) a liquid hardener conduit means connecting the liquid hardener reservoir to the means for mixing liquid resin and liquid hardener and means for moving the hardener through said conduit means to the means for mixing liquid resin and liquid hardener;
   (g) a resin pump for moving resin from the liquid resin reservoir through the resin conduit means to the means for mixing liquid resin and liquid hardener and a variable output capacity power source for driving said resin pump;
   (h) means for sensing the instantaneous speed of the resin pump; and
   (i) means for varying the instantaneous power output of the power source for driving the resin pump such that said output is proportional to the instantaneous speed of said resin pump.

2. The apparatus as defined in claim 1 wherein the means for moving the hardener through the hardener conduit means from the hardener reservoir to the means for mixing liquid resin and liquid hardener is a hardener pump driven by a second variable output capacity power source and wherein there is a means for sensing the instantaneous speed of the hardener pump and a means for varying the output of said second variable power source such that said output is proportional to the instantaneous speed of said hardener pump.

3. The apparatus as defined in claim 1 wherein the means for mixing liquid resin and liquid hardener is adjacent to the adhesive dispersing means.

4. The apparatus as defined in claim 1 wherein the variable output capacity power source is a direct current electrical motor connected in electrical circuit to a direct current electrical power source.

5. The apparatus as defined in claim 4 wherein the resin pump has a rotatable axial shaft and the direct current electrical motor has a rotatable axial shaft and said shafts are connected by means for transmitting rotational motion.

6. The apparatus as defined in claim 5 wherein the means for sensing the instantaneous speed of the resin pump is positioned adjacent the axial shaft of the direct current electrical motor so as to sense the instantaneous speed of said axial shaft of the electrical motor and thereby indirectly sense the instantaneous speed of the resin pump.

7. The apparatus as defined in claim 2 wherein the second variable output capacity power source is a second direct current electric motor connected in electrical circuit to a direct current electrical power source.

8. The apparatus as defined in claim 7 wherein the hardener pump has a rotatable axial shaft and the direct current electrical motor has a rotatable axial shaft and said shafts are connected by a means for transmitting rotational motion.

9. The apparatus as defined in claim 8 wherein the means for sensing the instantaneous speed of the hardener pump is positioned adjacent the axial shaft of the second direct current electrical motor so as to sense the instantaneous speed of said axial shaft of the second electrical motor and thereby indirectly sense the instantaneous speed of the resin pump.

10. The apparatus as defined in claim 2 wherein control means are provided for adjusting the speeds of the resin pump and the hardener pump by proportional amounts.

11. The apparatus as defined in claim 10 wherein control means are provided for moving a surface to be bonded beneath the adhesive dispersing means and wherein there is also provided sensing means for detecting the absence of said surface to be bonded and control means for simultaneously stopping the resin pump and the hardener pump in response to such stopping of said surface to be bonded.

12. The apparatus as defined in claim 10 wherein there is provided a means for forcing air into the means for mixing liquid resin and liquid hardener and control means for activating said means for forcing air into the means for mixing liquid resin and liquid hardener in response to the absence of the surface to be bonded.

13. The apparatus as defined in claim 10 wherein there is provided a means for forcing water into the means for mixing liquid resin and liquid hardener and control means for activating said means for forcing water into said means for forcing water into the means for mxing liquid resin and liquid hardener in response to the absence of the surface to be bonded.

14. The apparatus as defined in claim 1 wherein the means for sensing the instantaneous speed of the resin pump is a means for continuously sensing the instantaneous speed of the resin pump.

15. The apparatus as defined in claim 1 wherein the means for sensing the instantaneous speed of the resin pump is a means for intermittently sensing the instantaneous speed of the resin pump.

16. A method for mixing and applying a multi-component liquid adhesive comprising:
   (a) moving a liquid hardener from a hardener reservoir through a hardener conduit to a means for mixing liquid resin and liquid hardener;
   (b) moving a liquid resin from a resin reservoir through a resin conduit to a means for mixing resin and hardener;
   (c) sensing the instantaneous speed of the resin pump;
   (d) adjusting the instantaneous output of the resin pump power source such that it is proportional to the instantaneous speed of the resin pump;
   (e) continuously mixing the liquid resin and the liquid hardener in the means for mixing resin and hardener to form an adhesive; and
   (f) continuously dispersing said adhesive.

17. The method as defined in claim 16 wherein the hardener is moved through the hardener conduit from the hardener reservoir to the means for mixing resin and liquid hardener by means of a hardener pump which is driven by a second variable output capacity power source and wherein there is performed the additional steps of sensing the instantaneous speed of the hardener pump and adjusting the output of the hardener pump power source such that it is proportional to the instantaneous speed of the hardener pump.

18. The method as defined in claim 16 wherein the instantaneous speed of the resin pump is continuously monitored.

19. The method as defined in claim 16 wherein the instantaneous speed of the resin pump is intermittently monitored.

* * * * *